Patented Jan. 3, 1933

1,893,117

UNITED STATES PATENT OFFICE

DUANE E. WEBSTER AND BAALIS SANFORD, OF WORCESTER, MASSACHUSETTS, ASSIGNORS TO NORTON COMPANY, OF WORCESTER, MASSACHUSETTS, A CORPORATION OF MASSACHUSETTS

METHOD OF MAKING ARTICLES OF RESIN BONDED GRANULAR MATERIAL

No Drawing.   Application filed February 28, 1930.   Serial No. 432,261.

This invention relates to articles of resin bonded granular material and to a method of making the same.

Various articles, such as a grinding wheel, have been made heretofore of grains bonded together by a phenolic resin such as is obtained by the initial reaction of a phenol upon formaldehyde. As explained in the patent to Brock No. 1,537,454, a grinding wheel may be made by mixing the abrasive grains and powdered resin and then adding a suitable proportion of furfural to make the resin plastic, after which the mixture is molded under pressure and heated to harden the bond.

It has also been proposed to carry on this procedure by first wetting the abrasive grains with the liquid furfural and thereafter mixing the phenolic resin with the mass, it having been considered that the furfural would form a liquid coating on the abrasive grains and dissolve enough of the resin, later added to the mass, to form a dissolved coating of the resinous material on each abrasive grain. This particular method, however, has an inherent disadvantage owing to the fact that furfural acts very quickly on the resin and often does not give sufficient time to finish the mixing operation. In that case, the mass tends to ball up or to form hard lumpy portions or aggregates, and the presence of these lumpy portions means that the mixture is not uniform and that the grinding wheel structure cannot be made with the uniformity which is required in this field.

It is accordingly the primary object of this invention to overcome such disadvantages and to provide a method of making an article of granular material bonded by a synthetic resin which will be simple in its procedure, which will insure a uniform and proper distribution of the bond among the grains and which will result in an improved article of commercial value.

With this and other objects in view as will be apparent to one skilled in the art, this invention resides in the combination of process steps and the structure of the article as herein defined and as covered by the claims appended hereto.

In accordance with this invention it has been discovered that an article made of granular material bonded by a synthetic resin may be satisfactorily manufactured in accordance with the following procedure. The synthetic resin, which comprises a reactive resinoid of the heat hardening type, such as a phenolic resin known on the market under the trade-mark of "Bakelite" in powdered form, and a granular material, such as abrasive grains, are mixed together in the desired proportions, and either before or after this mixing operation there is added a neutral liquid which is capable of wetting the abrasive grains without dissolving or chemically reacting with or otherwise having any detrimental effect upon the resin, and which however is miscible with the solvent ultimately used to plasticize the resin. In practice, however, it is preferable that the abrasive grains be first wetted with the neutral liquid prior to mixing them with the resin bond. As examples of a neutral oil or liquid suitable for this purpose, we may use xylol, or a neutral creosote oil known on the market as "Carbosota", or kerosene, gasoline and the like. It is preferable to use only a small amount of the grain wetting liquid, since it is merely necessary that the abrasive grains be sufficiently wetted so as to cause the small particles of resin powder to adhere or stick to the surface of each abrasive grain and so coat it more or less uniformly with the material which is to ultimately serve as its binder. In this way a considerable amount of the resin is properly distributed around the abrasive grains and yet is not permitted to dissolve or otherwise detrimentally react at this stage of the process. The material is then ready for the plasticizing operation but this step may be delayed if desired without affecting the final stages of the process. It will be understood that the order of mixing the ingredients above specified may be varied as desired, provided the resin solvent and plasticizer is not added until the abrasive grains and at least some of the resin and neutral oil have been mixed to locate the resin in close proximity to the abrasive grains before it is plasticized.

A further feature of this invention is involved in the method of plasticizing the resin, and resides in introducing the furfural or other resin solvent in very small increments and in such a manner as to insure that practically every resin particle receives the solvent slowly and to a considerable extent at a uniform rate. This is best effected by introducing the solvent to the resin-abrasive mixture as a spray and preferably by means of a spray gun which will atomize and distribute the spray throughout a considerable portion of the mixture but without introducing a blast of air which might tend to dislodge the resin particles and create a dust and otherwise to segregate the resin. The operation is preferably carried on in a rotating tumbling barrel arranged to provide a steady falling stream of well distributed material which receives the spray throughout a considerable area, whereby a large number of grains are subjected to the spray at one time. This insures a uniform mixing of the resin and its solvent.

This solvent and plasticizer may be a material, such as ethylene glycol, which serves the simple function of making a plastic body of the resinous material; or, if it is desired to employ a material which is capable of serving not only as a plasticizer but also as a hardener by reaction with the synthetic resin, then furfural as above stated may be employed. Since furfural has a very rapid solvent action on the resin it is desirable in many cases to dilute it with a sufficient proportion of a neutral liquid, such as is originally used to wet the grains, and thus delay the solvent action so as to make it possible for the bond to become thoroughly and uniformly treated and to prevent the resin solvent from reaching only a part of the mass and thus forming balls or aggregates of plastic material. After this resin solvent has been properly mixed with the mass it may then be subjected to the usual molding, pressing and heating operations, such as specified in the patent to Brock, in order to harden and convert the resin and form a solid matured resinoid article which will serve satisfactorily as a grinding wheel.

It is also within the scope of this invention to add only a portion of the total resin used to the original batch containing the neutral oil, so as to insure having substantially all of the resin adhere to the grains. Then when the furfural is added, each particle of resin is plasticized in the presence of a given grain to which is may adhere. If further resin and more of the neutral oil are added after this, the added resin will mix properly and uniformly with the grains and their plastic or semi-plastic coatings. This variation in the procedure minimizes the loss of the resin as a dust in the initial stages and prevents any considerable segregation of the resin in the machine apart from the abrasive grains.

While various types of granular material may be utilized in an article of this general type and various resinous bodies and neutral liquids as well as resin solvents may be employed and in desired amounts as will be understood by those skilled in the art, yet as a specific example of a composition which will be satisfactory for the purpose of making a grinding wheel, the following ingredients and proportions may be employed:

| | |
|---|---|
| Granular abrasive material, such as silicon carbide | 1000 grams |
| Powdered synthetic resin (Bakelite) | 126 " |
| Xylol | 6 cc. |
| Mixture of xylol 75% and furfural 25% | 20 " |

If neutral creosote oil is employed, one suitable grinding wheel may be made up by using 60 cc. of furfural and 15 cc. of the creosote oil per pound of resin containing the abrasive grains. For example, if crystalline alumina abrasive of a grit size which will just pass through a screen of 14 meshes to the linear inch is employed, we may utilize the following ingredients in the proportions sepcified:

| | |
|---|---|
| Crystalline alumina | 90 lbs. |
| Neutral creosote oil | 135 cc. |
| Phenolic formaldehyde resin (Bakelite) | 9 lbs. |
| Furfural | 540 cc. |

By using the ingredients and the process steps as specified, the factory methods are simplified and improved and a uniform grinding wheel structure is obtained with a resultant superiority and efficiency in the grinding operation. It will be appreciated that various changes in the ingredients and their proportions may be made within the knowledge of those who are skilled in the art of making bonded articles of this type.

Having thus described the invention, what we claim as new and desire to secure by Letters Patent is:

1. The method of making a resinoid bonded abrasive article comprising the steps of making a mixture of abrasive grains and a resinoid powder with a neutral, non-aqueous liquid which is miscible with the plasticizer and will wet the grains and cause the resinoid to adhere thereto, but without chemically reacting with the resinoid, thereby forming a stable mixture of abrasive and resinoid, and thereafter adding to the mixture a plasticizer for the resinoid and molding and heating the mixture to convert the resinoid and form an integral structure.

2. The method of making an article of resinoid bonded granular material comprising the steps of wetting the grains with a neutral, non-aqueous liquid which is miscible with the plasticizer and will wet the grains and cause the resinoid bond to adhere thereto, but without chemically reacting therewith, mixing the resinoid bond with the wetted grains and thereby forming a chemically stable mixture, and thereafter adding a plasticizer for the resinoid, while stirring the mixture, and forming a plastic mass thereof and then molding the material to the desired shape and heating it to convert the resinoid and form an integral structure.

3. The method of making a resinoid bonded abrasive article comprising the steps of making a mixture of abrasive grains and a resinoid powder with a neutral, non-aqueous liquid which is miscible with the plasticizer and will wet the grains and cause the resinoid to adhere thereto, but without chemically reacting with the resinoid, thereby forming a stable mixture of abrasive and resinoid, and subsequently spraying a plasticizer for the resinoid into the mixture, while rapidly stirring the same, and thereafter heat treating the material in molded form to mature and set the resinoid and form an integral structure.

4. The method of making a resinoid bonded abrasive article comprising the steps of wetting the abrasive grains with a neutral oil which will not chemically react with the resinoid powder but will cause it to adhere to the grains and then mixing the resinoid powder therewith and forming a stable mixture, and subsequently mixing furfural quickly with the stable mixture, while stirring it rapidly, in order to form a uniform plastic mixture, shaping the mixture in a mold and then heat treating it to convert the resinoid and to form an integral structure.

Signed at Worcester, Massachusetts, this 27th day of Feb. 1930.

DUANE E. WEBSTER.
BAALIS SANFORD.